United States Patent
Fleck et al.

(10) Patent No.: US 8,940,451 B2
(45) Date of Patent: Jan. 27, 2015

(54) PLANAR HIGH-TEMPERATURE FUEL CELL

(75) Inventors: Robert Fleck, Adelsdorf (DE); Horst Greiner, Forchheim (DE); Alessandro Zampieri, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 965 days.

(21) Appl. No.: 13/121,571

(22) PCT Filed: Sep. 24, 2009

(86) PCT No.: PCT/EP2009/062366
§ 371 (c)(1),
(2), (4) Date: Jun. 9, 2011

(87) PCT Pub. No.: WO2010/037681
PCT Pub. Date: Apr. 8, 2010

(65) Prior Publication Data
US 2011/0229796 A1 Sep. 22, 2011

(30) Foreign Application Priority Data
Sep. 30, 2008 (DE) .................. 10 2008 049 712

(51) Int. Cl.
*H01M 8/10* (2006.01)
*H01M 4/36* (2006.01)
*H01M 8/02* (2006.01)
*H01M 8/12* (2006.01)

(52) U.S. Cl.
CPC .......... *H01M 8/0232* (2013.01); *H01M 8/0245* (2013.01); *H01M 8/1226* (2013.01); *H01M 2008/1293* (2013.01); *Y02E 60/521* (2013.01); *Y02E 60/525* (2013.01)
USPC ............ 429/481; 429/479; 429/484; 429/491

(58) Field of Classification Search
USPC .................................. 429/479, 481, 484, 491
See application file for complete search history.

(56) References Cited

U.S. PATENT DOCUMENTS

| | | | | |
|---|---|---|---|---|
| 7,235,325 B2 * | 6/2007 | Ukai et al. | | 429/486 |
| 7,351,488 B2 * | 4/2008 | Visco et al. | | 429/486 |
| 8,232,020 B2 * | 7/2012 | Niewolak et al. | | 429/468 |
| 2002/0177026 A1 | 11/2002 | Fukuzawa et al. | | |

FOREIGN PATENT DOCUMENTS

| | | |
|---|---|---|
| CN | 1750307 A | 3/2006 |
| DE | 102006056251 A | 5/2008 |
| EP | 6424732 A1 | 5/1991 |

(Continued)

OTHER PUBLICATIONS

Fuel Cells Systems: Towards Commerzialition; Siemens Power Journal Jan. 2001, 2001; pp. 10-13 (Herausgeber Siemens AG).
VIK—Berichte "Brennstoffzellen", No. 214; Nov. 1999, pp. 49-62.
Branden et al.; "Development of Metal Supported Solid Oxide Fuel Cells for Operation at 500-600° C.", Journal of Materials Engineering and Performance, vol. 13; Jun. 2004; pp. 253-256.

*Primary Examiner* — Patrick Ryan
*Assistant Examiner* — Julian Anthony

(57) ABSTRACT

A planar high temperature fuel cell, a use and a method of manufacture are discloses. The planar high-temperature fuel cell with includes a layer structure. The layer structure includes a cathode layer, an anode layer and a solid electrolyte layer disposed between the cathode layer and the anode layer. Each of the layers are planar. A porous metal structure is used as the support for the layer structure and is also planar.

14 Claims, 2 Drawing Sheets

(56) References Cited

FOREIGN PATENT DOCUMENTS

| | | |
|---|---|---|
| EP | 1255318 A2 | 11/2002 |
| EP | 1263067 A2 | 12/2002 |
| EP | 2031684 A2 | 3/2009 |
| GB | 2434691 A | 8/2007 |
| WO | WO 2006/082057 A2 | 8/2006 |
| WO | WO 2007/095658 A2 | 8/2007 |
| WO | WO 2008/138787 A1 | 11/2008 |

* cited by examiner (metal sinter microstructure with open porosity)

PLANAR HIGH-TEMPERATURE FUEL CELL

CROSS REFERENCE TO RELATED APPLICATIONS

This application is the US National Stage of International Application No. PCT/EP2009/062366, filed Sep. 24, 2009, and claims the benefit thereof. The International Application claims the benefits of German application No. 102008049712.6 filed Sep. 30, 2008. All of the applications are incorporated by reference herein in their entirety.

FIELD OF INVENTION

The invention relates to a planar high-temperature fuel cell. The invention also relates to the fuel cell system comprised of same and to a method for the production thereof.

BACKGROUND OF INVENTION

Solid electrolyte high-temperature fuel cells are essentially characterized by a solid ceramic electrolyte which is generally implemented as an oxide ceramic layer between two electrodes. A fuel cell of this kind (SOFC=Solid Oxide Fuel Cell) generally has an operating temperature of 600 to 1000° C. At this temperature, the electrochemical reaction is optimized. Low operating temperatures tend to reduce the costs of a fuel cell system.

In the power range >100 kW, primarily high-temperature fuel cell systems (SOFC) of tubular design have hitherto been operated worldwide. The associated cells are of all-ceramic design, with the different functional layers being deposited on a ceramic support. The support is located on the air side of a cell and consists of cathode material. The potential of such fuel cells has been disclosed in various publications, e.g. in "Fuel Cells Systems: Towards Commercialization" in Power Journal 2001, pp. 10-13 (publisher: Siemens AG).

An alternative to the tubular fuel cell is the planar fuel cell having a planar layer structure. Planar SOFCs are described, for example, in the publication VIK Reports "Brennstoffzellen" ("Fuel Cells"), No. 214 (November 1999), p. 49 et seq.

The high operating temperatures necessary for an all-ceramic cell are deemed acceptable, as, on the other hand, extremely low degradation values can be achieved with these systems, said values being below 0.1% over 1000 h operation which is the yardstick for evaluating fuel cells.

In the case of all-ceramic fuel cells, problems with manufacturing the cathode support may arise. Tube inhomogeneities increase the likelihood of support breakage, thereby affecting yields. In addition, all-ceramic cells require tighter manufacturing tolerances because of the large number of production steps, thereby likewise possibly limiting usability.

It has already been a matter of discussion in the industry that fuel cells operating at low or medium temperatures open up a number of new possibilities. This applies particularly to material selection for the cells and peripheral equipment. For example, low operating temperatures of approximately 600° C. permit the use of high-alloy high-grade steels and/or other metal alloys in the individual fuel cell module and associated peripherals.

SUMMARY OF INVENTION

Proceeding on this basis, the object of the invention is to propose a novel planar fuel cell with ceramic electrolyte, providing in particular the possibility of a reduced operating temperature.

The object is achieved according to the invention by a fuel cell the use of a series connection of such fuel cells to construct a corresponding fuel cell system, and a method for manufacturing such a fuel cell or rather a fuel cell system constructed therefrom are the subject matter of the independent claims. Further developments of the fuel cell or rather fuel cell system and of the associated manufacturing process are set forth in the dependent claims.

The essential aspect of the new solid ceramic fuel cell is that a porous metal support for the functional layers (cathode, electrolyte, anode) is present on the cathode side. With such metal supports, fuel cells of this kind can be operated in the range from 400 to 800° C., advantageously at 600° C. Such temperatures place much less exacting requirements on the construction of the peripherals, but also on the construction of the fuel cell itself. Because of the temperature reduction, the manufacturing costs can be brought down, while at the same time achieving better mechanical properties of the cells and offering the possibility of improved process control. This also applies in particular to the production of the electrodes and/or of the electrolyte as functional layers on the metal support.

The useful life of such a fuel cell is little affected by using a metal support. The wall thickness of the metal support can be considerably reduced compared to the ceramic version. This means that the polarization resistances which affect oxygen diffusion are much lower on the cathode side. In addition, high-alloy high-grade steel powders are much less expensive than ceramic cathode powders (LSM or LCM).

All in all, there is a significant cost saving with at least equivalent electrochemical performance of the cell as a whole.

The novel porous metal support for the functional layers can be produced using normal powder metallurgy manufacturing methods. These are somewhat less expensive than ceramic production processes.

Although a fuel cell design with a metal support on the anode side is specifically known from the prior art, particularly the publication N. P. Branden et al. in "Journal of Materials Engineering and Performance" 13 (2004), pages 253 to 256, the invention for the first time shows the feasibility of using a metal substrate on the cathode sides.

An essential advantage of the present invention with the metal substrate on the cathode side is that the bulk resistance on the cathode side can be kept negligibly low as a result. This is one of the weaknesses in all SOFCs of anode-side-supported, tubular cell design. There the electrons must be distributed over the cathode e.g. using silver wire.

Although when using porous metals on the cathode side it must be noted that the chromium oxide surface layers forming on the surface of the chromium-containing metal structures are relatively poorly conducting and that volatile chromium compounds evaporate from these surfaces and may have a negative effect on the electrochemical properties of the cathode, these characteristics are taken into account in the invention by selecting specific alloys which exhibit particularly slow growth of the chromium oxide surface layer (e.g. Plansee material IT11). As the ohmic resistance is dependent on the layer thickness, a very small voltage drop across the oxide layer can be expected. Being a thermally activated process, chromium evaporation is also heavily temperature-dependent and is markedly diminished with reduced operating temperature. Should the evaporation rates have to be reduced still further, the support can be provided with appropriate barrier layers.

Materials suitable for use as cathode substrate supports in the SOFC according to the invention are sintered metals known from the prior art, e.g. based on high-alloy, ferritic high-grade steels with high chromium content. Material types known in the industry as CROFER22APU (Thyssen Krupp) or IT11-IT14-ITM26 (Plansee) or ZMG32 (Hitachi) appear to be particularly suitable.

BRIEF DESCRIPTION OF THE DRAWINGS

Further details and advantages of the invention will emerge from the following description of exemplary embodiments with reference to the accompanying drawings and associated claims.

In highly schematic form.

DETAILED DESCRIPTION OF INVENTION

Figure 1:
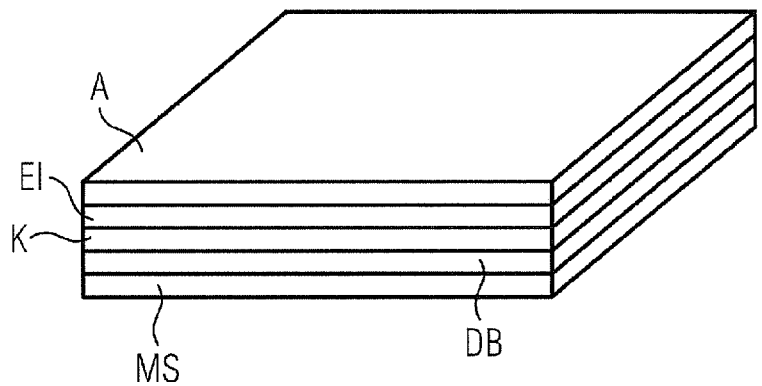
FIG. 1 shows a perspective view of a planar fuel cell.

In the figures, identical parts are provided with the same reference characters in each case. Some of the figures are described jointly.

Figure 2:
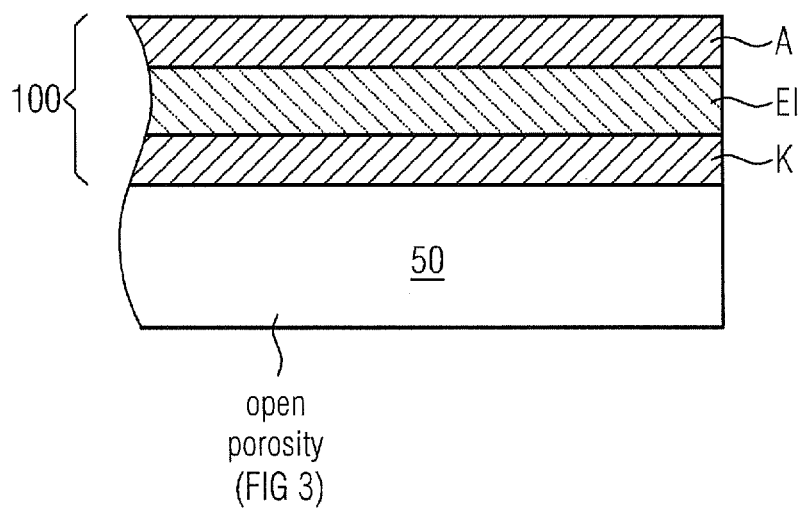
FIG. 2 shows a section through the layer sequence of the functional layers on a metal substrate and FIG. 3 shows the porous metal support structure as the base element for coating with the functional layers.

FIG. 1 shows a perspective view of a planar fuel cell and FIG. 2 an associated section. Reference numeral 5 denotes the metal support made of a sintered material which has a predefined porosity, functional layers for the SOFC being deposited on the upper side of the support structure. The functional layers consist specifically of the cathode K, the solid electrolyte El and the anode A. The layer structure as a whole is denoted by 100.

In the layer structure 100, the solid electrolyte El of known composition is disposed as a thin layer between cathode K and anode A. The layered electrodes on the one hand and the layered solid electrolyte on the other can be formed from sub-layers interspersed with adaptation layers, for which reference is made to the prior art.

In FIG. 1, an additional layer DB can be disposed as a diffusion barrier between the support structure 50 and the functional layers, as will be described in greater detail below. The electrolyte in particular can be implemented as a uniform layer or as a combination of two or more layers. Known for this purpose from the prior art are so-called ScSz with GDC layers or YSz with GDC layers. Such zirconium-based electrolytes on the upper side and GDC on the underside in contact with the cathode or vice versa have been found to be suitable in the prior art. It is also possible to design the solid electrolyte as a symmetrical three-layer sandwich structure.

To construct a fuel cell system, the constituent fuel cells described with reference to FIG. 1 are stacked to form in this case in particular an electrical series connection.

A wide range of materials can be used as materials for the porous metal support: a sintered high-grade steel known as CroFer22APU or even a titanium-niobium alloy with high chromium content (17%) appear suitable. However, care must be taken to ensure that the chromium does not evaporate and possibly contaminate the cathode and therefore the fuel cell. To this end, suitable measures must be provided which will be described below.

Figure 3:
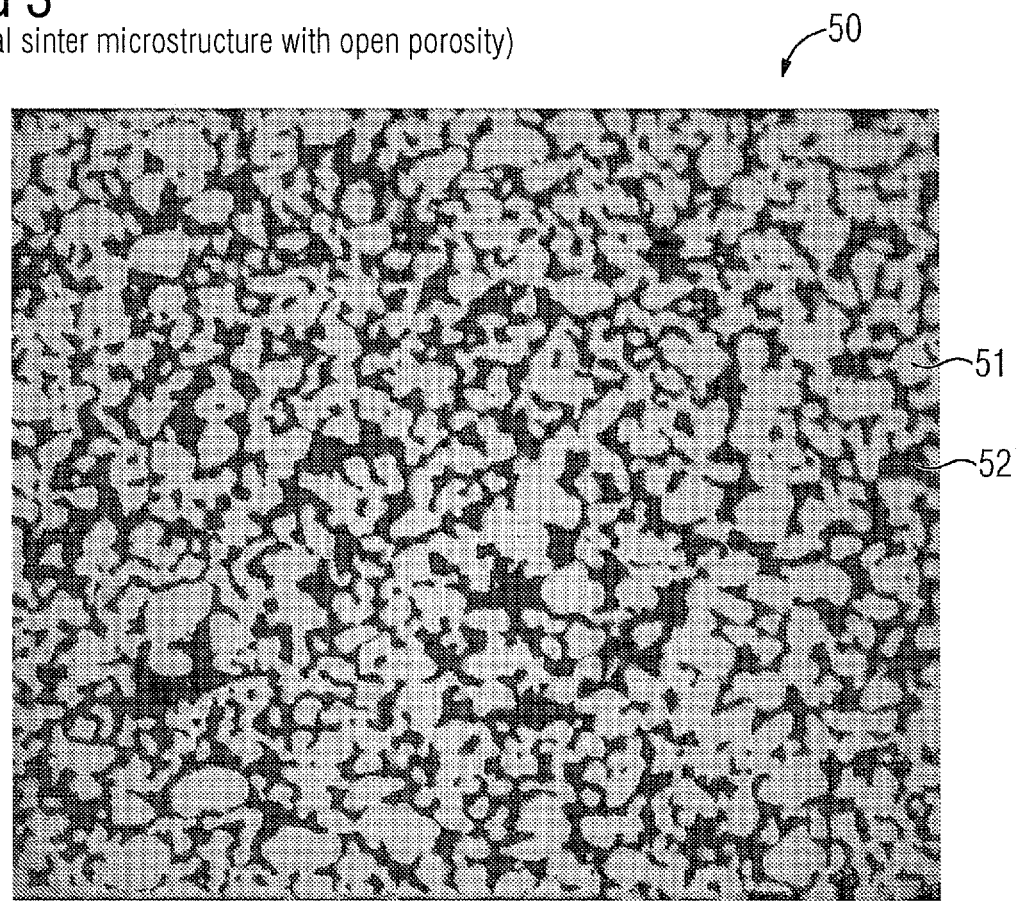

The layer sequence is illustrated in FIG. 2. The essential feature is the porous metal structure 50 as a support for the functional layers 100. A microsection through such a structure 50 is shown in FIG. 3, showing alternately metal particles 51 and pores 52. Here the magnification is evidenced by the dimensioning. The microsection is etched such that the particles appear as light areas. Clearly discernible therefore is the open porosity of the sintered metal material which ensures sufficient passage for reactants or rather reaction products, said porosity being >5%, e.g. approximately 10%.

The structures described above have significant advantages over the all-ceramic structures. The essential point is that the metal substrates allow lower operating temperatures then the ceramically constructed fuel cells. This is also accompanied by lower temperatures in the fuel cells periphery. Although these properties are well-known in principle, using a porous metal support for the functional layers on the air side is not a known practice. If necessary, said metal support can also be coated with further layers in order to prevent Cr from penetrating to the cathode. In particular, a diffusion barrier layer can be applied between the substrate and the cathode. The diffusion barrier layer can be:

(A) A thin and thick film on the inner and outer surface of the metal substrate. Possible manufacturing techniques for this purpose include for example CVD, dip coating or electrochemical treatment (B) A porous layer (e.g. $LaCrO_3$) on the outer surface of the metal substrate. Possible manufacturing techniques include for example plasma spraying, LPPS, APS or wet powder spraying with subsequent heat treatment.

In alternative (A), Cr evaporation and Cr solid diffusion are prevented, thereby reducing possible degradation of the cathode. In alternative (B), primarily solid-phase diffusion of Cr is prevented.

A metal cathode substrate cell can be produced e.g. as follows:

Production of a metal cathode substrate support e.g. by extrusion or tape casting.

If necessary, coating of the support with a Cr diffusion barrier layer e.g. by means of CVD. If the support material contains aluminum, an $Al_2O_3$ anti-diffusion layer is produced "in situ" during the sintering process.

As cathode materials, e.g. LSF, LSCF, LSC, nickelates or mixed oxides (LSM/YSZ, ScSZ, GCO) can be applied by PVD or plasma spraying techniques in the known manner. In this connection, reference is made to the relevant technical literature. In the present case, postheat treatments above 800° C. should be avoided.

The electrolyte is applied in a process which directly produces thick layers. Possible techniques include APS, LPPS and PVD. The electrolyte can be made from the following materials: YSZ, ScSZ, GDC, SDC. The electrolyte can also consist of a plurality of these materials in order to prevent e.g. interfacial reactions with the cathode and anode.

Possible anode materials are Ni- and/or Cu-based cermets which are applied by the above mentioned methods.

The interconnector can either be applied to the metal substrate as a ceramic layer, in which case the above mentioned methods can be used or, alternatively, the relevant surface areas of the substrate are sealed with a metal solder.

The porous metal layer 50 consists of sintered metal particles, as already described above with reference to FIG. 3. In particular, high-grade steels are possible for this purpose. However, as high-grade steels with comparatively high chromium content have proved suitable for the support layer, care must be taken to ensure that during operation of the fuel cell little chromium is evaporated even at the low operating temperature.

Possibilities for minimizing chromium evaporation are described in detail in a parallel patent application of the Applicant with the same application priority, entitled "Method for protecting a chromium-containing, sintered metal substrate for use in a high-temperature fuel cell, and associated high-temperature fuel cell or fuel cell system".

For the planar high-temperature fuel cell (SOFC) described above it is essential that the support for the functional layers is a porous metal structure on the air side (cathode side) of the fuel cell. Sintered metals based on high-grade steels can be used for this purpose. The functional layers can be deposited thereon e.g. by means of PVD methods, possibly magnetron sputtering.

The invention claimed is:

1. A planar high-temperature fuel cell, comprising:
a layer structure, comprising:
a cathode layer,
an anode layer, and
a solid electrolyte layer disposed between the cathode layer and the anode layer; and
a porous metal structure is used as a support for the layer structure, the porous metal structure and each of the layers of the layer structure being of planar design, the porous metal structure being arranged on a cathode side of the layer structure,
wherein the solid electrolyte consists of two layers with different materials.

2. The fuel cell as claimed in claim 1, further comprising:
a diffusion-limiting layer applied to the porous metal structure and the layer structure deposited on the diffusion-limiting layer.

3. The fuel cell as claimed in claim 1, wherein the solid electrolyte consists of ScSz and YSz.

4. The fuel cell as claimed in claim 1, wherein in that the porous metal structure is permeable to the diffusion of reactants or reaction products.

5. The fuel cell as claimed in claim 1, wherein the porous metal support is a sintered high-grade steel.

6. The fuel cell as claimed in claim 5, wherein the porosity of the porous metal is greater than 5%.

7. The fuel cell as claimed in claim 6, wherein the porosity of the porous metal is 10%.

8. The fuel cell as claimed in claim 5, wherein the porous metal a FeCrR alloy is used, where R stands for a metal component different from Fe or Cr.

9. The fuel cell as claimed in claim 5, wherein the porous metal comprises a high-grade steel or a Ti-Nb alloy.

10. The fuel cell as claimed in claim 1, wherein the operating temperature of the fuel cell is between 400 and 800° C. in order to reduce the oxidation kinetics of the metal substrate as far as possible.

11. The fuel cell as claimed in claim 10, wherein the operating temperature of the fuel cell is between 500 and 700° C.

12. The fuel cell as claimed in claim 10, wherein the planar design of the individual fuel cells results in a seal-less sandwich construction of the fuel cell stack.

13. The fuel cell as claimed in claim 12, wherein interconnectors for electrically connecting individual fuel cells are present.

14. A planar high-temperature fuel cell, comprising:
a layer structure, comprising:
a cathode layer,
an anode layer, and
a solid electrolyte layer disposed between the cathode layer and the anode layer; and
a porous metal structure is used as a support for the layer structure, the porous metal structure and each of the layers of the layer structure being of planar design, the porous metal structure being arranged on a cathode side of layer Structure,
wherein the solid electrolyte consists of two layers with different materials, and
wherein the different layers are ScSz and YSz.

* * * * *